United States Patent [19]

Phillips

[11] 4,117,624
[45] Oct. 3, 1978

[54] INSECT TRAP
[75] Inventor: Dennis G. Phillips, Lititz, Pa.
[73] Assignee: Pestolite, Inc., Lancaster, Pa.
[21] Appl. No.: 818,393
[22] Filed: Jul. 25, 1977
[51] Int. Cl.² ............................................. A01M 1/04
[52] U.S. Cl. ........................................ 43/113; 43/114
[58] Field of Search ................. 43/113, 114, 115, 116, 43/117

[56] References Cited
U.S. PATENT DOCUMENTS

| 449,138 | 3/1891 | Roth | 43/113 |
|---|---|---|---|
| 808,460 | 12/1905 | Laube | 43/113 |
| 1,148,748 | 8/1915 | Brewer | 43/113 |
| 1,461,169 | 7/1923 | Wilson | 43/113 |
| 3,023,539 | 3/1962 | Emerson | 43/114 |
| 3,336,694 | 8/1967 | O'Connell | 43/113 |

Primary Examiner—Nicholas P. Godici
Assistant Examiner—Roscoe V. Parker
Attorney, Agent, or Firm—Martin Fruitman

[57] ABSTRACT

A compact insect trapping appliance which uses an ultraviolet light to attract insects and a disposable sticky reflecting surface to trap them. The flat sheet configuration of the disposable sticky reflector allows it to be packaged, shipped, and stored easily. The disposable reflector is bent and slipped into a removeable reflector frame so it can be removed and disposed of after use without personal contact with the entrapped insects.

5 Claims, 2 Drawing Figures

INSECT TRAP

BACKGROUND OF THE INVENTION

The present invention relates generally to insect traps and more specifically to a trap which uses ultra-violet light to attract the insects to be trapped.

Many forms of insect traps exist both commercially and in the patent art, but most have in common the problem of disposal of entrapped insects or the trapping element. For most users of insect traps, the only thing more distressing than an accumulation of flying insects is an accumulation of dead ones in a container or on a sticky surface. The fewer actions that need to be taken to "empty" the trap and replenish the trapping element, the better the user feels about it. Yet, most of the prior art requires some action such as picking up a sheet of paper laden with dead insects, or unlatching or unfolding some type of structure. Replacing a new element usually involves folding into a complex structure a trap coated with a sticky substance which makes handling difficult. U.S. Pat. No. 3,023,539 is typical of just such a device.

A further difficulty with sticky insect traps is the manufacture, packaging and shipping of the trapping element. Complex shapes create more difficulty and expense in the manufacture and delivery to the ultimate consumer.

SUMMARY OF THE INVENTION

The present invention eliminates the problem of disposal of the insect-loaded element by mounting it in a simple detachable holder. The holder is the only item the user actually handles in removing the trapped insects from the apparatus. The old trapping element is pushed from the holder as the new element is loaded into it or by means of a toothpick or other simple tool. The action required for disposal is so simple that, for the squeamish, it could probably be done with the eyes closed, and it is completely safe in that no chemicals, insecticides or toxic substances are used.

Moreover, the manufacture, shipment, and packaging of the element is as simple as conceivable, since the trapping element is a simple rectangular sheet of reflectorized cardboard with a coating of a sticky material on one side to trap the insects which land upon it.

This cardboard is packaged in pre-cut multilayered units. The holder for the trap element is a trough-line structure into which the sheet is slipped after being creased to fit. The holder then attaches to an ultra-violet lamp fixture so that the trap element, on the inside of the holder, acts as a reflector for the lamp, with the sticky surface surrounding the lamp on three sides.

The insects attracted to the lamp actually see many images of the lamp on the reflector, and as they attempt to approach the images, or as they simply flutter about in confusion, they touch the sticky coating and are trapped. The action is similar to that occurring if the lamp itself would be coated with the sticky substance, but no loss of radiation or difficulty in cleaning the lamp is involved.

Moreover, the reflector action of the trap element concentrates the ultra-violet radiation emitting from the open side of the channel to give the effect of a much brighter source of light, which is more attractive to insects.

DETAILED DESCRIPTION OF THE INVENTION

Figure 1:
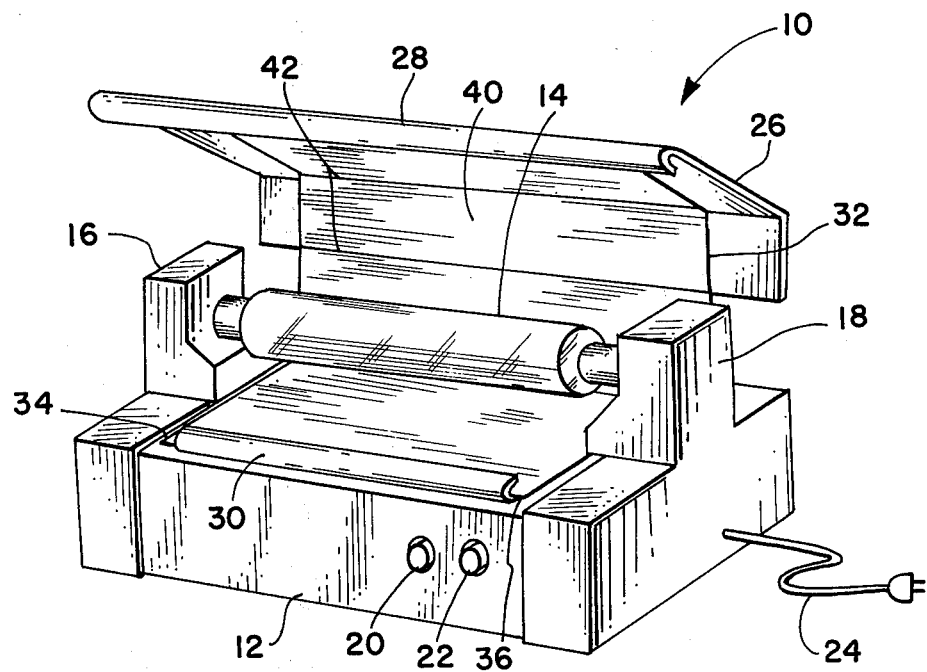
FIG. 1 is a perspective view of the invention.

The preferred embodiment of the invention is shown in FIG. 1 where insect trap 10 is shown in a perspective view as it might be utilized while sitting on a shelf or table inside a residence.

Support structure 12 holds ultra-violet lamp 14 by means of end fitting 16 and 18. Internal to support structure 12 is the power supply to supply appropriate electrical energy to energize lamp 14. Start button 20 and stop button 22 are used to control lamp 14 and power cord 24 is used to secure electrical power from conventional sources.

Figure 2:
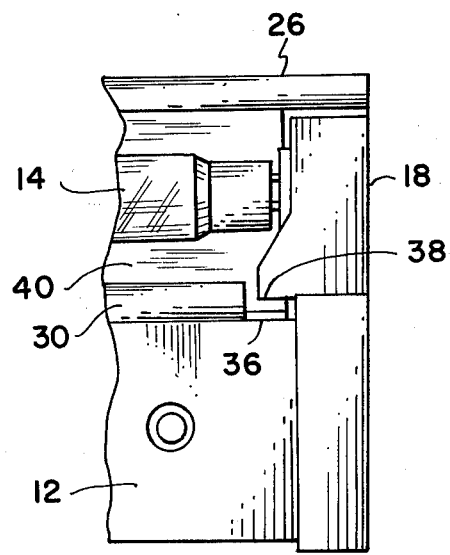
FIG. 2 is a detail of a preferred means for retaining the reflector holder on the apparatus.

Reflector holder 26 is shaped to a configuration of a trough with a cross-section approximately in the shape of a "U". Upper lip 28 and lower lip 30 are folded over at the open edges of the trough to form retaining lips for trapping element 32. Lower lip 30 is slightly shorter than the companion edge of reflector holder 26 so that protrusions 34 and 36 are formed upon the lower surface of reflector holder 26. As shown more clearly in FIG. 2, protrusions 34 and 36 permit reflector holder 26 to be held onto support structure 12 by sliding reflector holder 26 under overhang 38 of end fitting 18. A similar configuration operates at the other end of lower lip 30 between protrusions 34 and end fitting 16. Reflector holder 26 is removed from support structure 12 by sliding it rearward as viewed in FIG. 1.

When reflector holder 26 is separated from support structure 12, trapping element 32, which is covered with an insect trapping sticky substance on its reflectorized surface 40, is folded slightly at pre-creased lines 42 to match the angles of reflector holder 26, and slipped into either end of reflector holder 26. Trapping element 32 is slid the length of the reflector holder, while being retained by upper lip 28 and lower lip 30.

To dispose of trapping element 32 when it has become loaded with insects, it is only necessary to slide reflector holder 26 from support structure 12 and then slide trapping element 32 out from reflector holder 26. No direct contact with the trapped insects is required.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, no start button 20 or stop button 22 are required if a fluorescent starter is used instead.

What is claimed as new and desired to be secured by Letters Patent of the United States is:

1. An apparatus for trapping insects while attracting them by ultra-violet radiation comprising:
   an ultraviolet radiation source;
   a support means for supplying electrical power to and supporting the radiation source;
   a holder means detachably connected to the support means and oriented to essentially enclose the radiation source on three sides; and a trapping means, detachably held against the inside surface of the holder means, comprising a sheet of material reflectorized on one surface, and coated with a sticky substance on that same surface, said sticky substance capable of trapping insects, said trapping means being oriented so that the reflectorized sticky surface is facing toward the ultra-violet radiation source.

2. An apparatus for trapping insects while attracting them by ultra-violet radiation as in claim 1 wherein the trapping means is held against the inside surface of the holder means by retaining lips positioned along the edges of the holder means and wherein the trappping means is detached from the holder means by sliding it out of an open end of the holder means.

3. An apparatus for trapping insects while attracting them by ultra-violet radiation as in claim 1 wherein the trapping means is an essentially rectangular cardboard sheet with a metalized coating on one surface forming the reflectorized surface.

4. An apparatus for trapping insects while attracting them by ultra-violet radiation as in claim 1 wherein the trapping means is creased to more easily fold to conform to the shape of the holder means.

5. An apparatus for trapping insects while attracting them by ultra-violet radiation as in claim 1 wherein the ultra-violet radiation source is a lamp of long cylindrical configuration and the holder means is shaped into a trough-like configuration with open ends oriented in proximity to the ends of the radiation source.

* * * * *